(12) United States Patent
Lee

(10) Patent No.: US 6,206,796 B1
(45) Date of Patent: Mar. 27, 2001

(54) POWER TRANSMISSION MECHANISM USING METAL BELTS

(76) Inventor: Jong-wan Lee, 185-37 Seokbong-dong, Daeduck-gu, Daejeon (KR)

(*) Notice: Subject to any disclaimer, the term of this patent is extended or adjusted under 35 U.S.C. 154(b) by 0 days.

(21) Appl. No.: 09/354,022

(22) Filed: Jul. 15, 1999

(30) Foreign Application Priority Data

Jul. 16, 1998 (KR) .................................................. 98-28843

(51) Int. Cl.⁷ ............................... F16H 7/00; F16H 55/56
(52) U.S. Cl. .................................................. 474/84; 474/8
(58) Field of Search ...................................... 474/84, 8–10, 474/160, 168–170, 902, 85, 33–34

(56) References Cited

U.S. PATENT DOCUMENTS

| | | | |
|---|---|---|---|
| 3,016,755 | * | 1/1962 | Dittrich ............................. 474/242 X |
| 3,365,967 | * | 1/1968 | Moogk ................................. 474/8 X |
| 4,795,406 | * | 1/1989 | Dittrich et al. ......................... 474/8 |
| 5,685,793 | * | 11/1997 | Van Blaricom ..................... 474/85 X |

FOREIGN PATENT DOCUMENTS

251655 * 9/1934 (JP) .
602785 * 9/1934 (DE) .

* cited by examiner

*Primary Examiner*—David A. Bucci
*Assistant Examiner*—Marcus Charles

(57) ABSTRACT

A power transmission mechanism using metal belts including a driving pulley having first and second driving pulley-halves capable of advancing and retreating in an axial direction of a driving axis, the first and second driving pulley-halves having first and second belt guiding portions formed thereon to face each other, respectively, a driven pulley having first and second driven pulley-halves installed at a driven axis parallel to the driving axis to be capable of advancing and retreating along the driven axis, the first and second driven pulley-halves having third and fourth belt guiding portions formed thereon to face each other, respectively; and at least two metal belts capable of circulating around the belt guiding portions of the driving pulley and the driven pulley without interference, wherein each of the belt guiding portions is formed of an inclined surface having a predetermined curvature such that angular velocities of all belts can be identical at an arbitrary speed rate between the driving pulley and the driven pulley.

7 Claims, 4 Drawing Sheets

POWER TRANSMISSION MECHANISM USING METAL BELTS

BACKGROUND OF THE INVENTION

1. Field of the Invention

The present invention relates to a power transmission mechanism using a transmission belt, and more particularly, to a power transmission mechanism using a plurality of metal belts having different sizes and connected between a driving pulley and a driven pulley as a transmission belt.

2. Description of the Related Art

A belt transmission mechanism, one of various types of transmission mechanisms for transmitting power, transmits a rotational force of a driving pulley to a driven pulley via a belt. The belt is usually made of a rubber material which is elastic and flexible. However, the above rubber belt transmission mechanism cannot transmit huge power while changing speeds. That is, a thick belt such as a V belt is deformed when the belt runs contacting the driving pulley or the driven pulley along a curved path of its circulation due to the thickness thereof. This is because the outer circumferential surface of the belt expands while the inner circumferential surface thereof compresses. Therefore, the power transmission mechanism using the above belt is not capable of transmitting huge power.

Also, a power transmission mechanism having a structure in which metal belts are overlaid integrally has been suggested. However, the belt of the above type is limited in its elasticity so that the belt is severed or slips on the pulley, lowering the efficiency. That is, when the speed rate is not 1, since the angular velocities of the inner circumferential surface and the outer circumferential surface of the metal belt are different from one another, miscellaneous forces or slippage occurs between the pulley and the metal belt so that the belt may be damaged and the efficiency in power transmission is considerably lowered.

Further, a metal belt having a structure in which metal push blocks are stacked has been suggested. The metal belt has a structure of hundreds of stacked push blocks manufactured through a precision process one by one. However, to obtain a belt, the hundreds of precise push blocks and a metal layered belt for supporting each push block should be assembled. Thus, manufacture thereof is difficult and the cost for manufacture thereof is very high.

SUMMARY OF THE INVENTION

To solve the above problems, it is an objective of the present invention to provide a metal belt power, transmission mechanism in which a plurality of thin metal belts are connected between a driving pulley and a driven pulley so that each metal belt circulates along a curved path around the pulley at an equal angular velocity during the operation of the mechanism and large power can be effectively transmitted regardless of the rate of change of the speed.

Accordingly, to achieve the above objective, there is provided a power transmission mechanism using metal belts which comprises: a driving pulley having first and second driving pulley-halves installed to be capable of advancing and retreating in an axial direction of a driving axis, the first and second driving pulley-halves having first and second belt guiding portions formed thereon to face each other, respectively, a driven pulley having first and second driven pulley-halves installed at a driven axis parallel to the driving axis to be capable of advancing and retreating along the driven axis, the first and second driven pulley-halves having third and fourth belt guiding portions formed thereon to face each other, respectively; and at least two metal belts capable of circulating around the belt guiding portions of the driving pulley and the driven pulley without interference, wherein each of the belt guiding portions is formed of an inclined surface having a predetermined curvature such that the angular velocity of all belts can be identical at an arbitrary speed rate between the driving pulley and the driven pulley.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
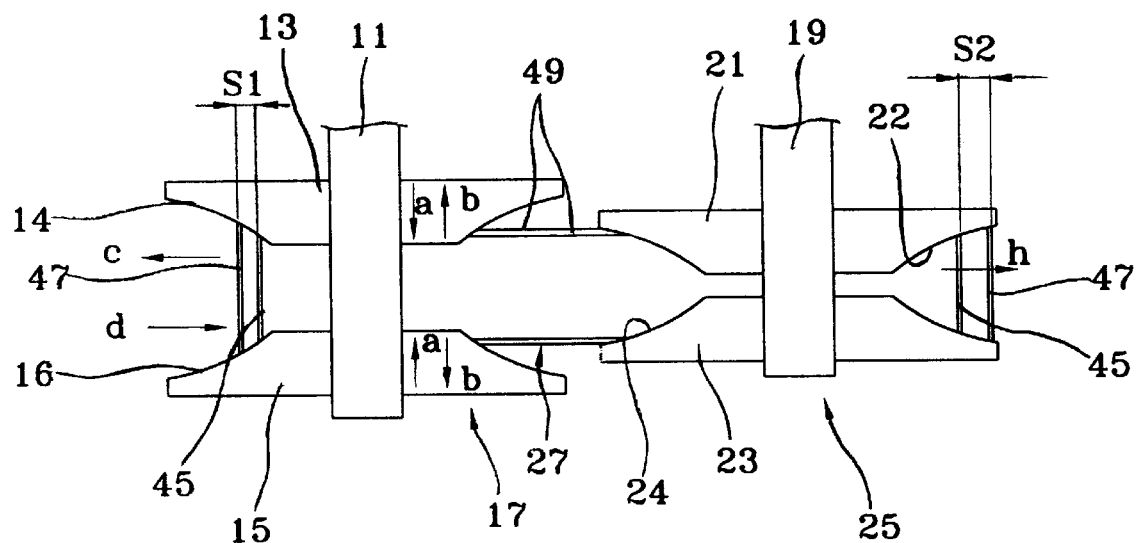
FIG. 1 is a view showing the structure of a power transmission mechanism using metal belt according to the first preferred embodiment of the present invention.

Referring to FIG. 1, a power transmission mechanism using a metal belt according to the first preferred embodiment of the present invention first and second pulley-halves 13 and 15 capable of rotating while receiving power from a driving axis 11 and simultaneously advancing and retreating in an axial direction of the driving axis 11, first and second driven pulley-halves 21 and 23 inserted around a driven axis 19 spaced a predetermined distance from and parallel to the driving axis 11 and capable of advancing and retreating in an axial direction of the driven axis 19, and two metal belts 27 transmitting the rotational force of the driving axis 11 to the driven axis 19. Of course, although two metal belts, an inner belt 45 and an outer belt 47, are adopted in the present preferred embodiment, use of three or more metal belts is possible.

A pair of the first driving pulley-half 13 and the second driving pulley-half 15 facing each other form a driving pulley 17, while a pair of the first driven pulley-half 21 and the second driven pulley-half 23 facing each other form a driven pulley 25.

The driving pulley 17 and the driven pulley 25 have the same shapes and belt guiding portions 14, 16, 22, and 24 are formed at each piece of the pulleys facing one another, respectively. That is, in the driving pulley 17, a first belt guiding portion 14 is formed at the first driving pulley-half 13 and a second belt guiding portion 16 is formed at the second driving pulley-half 15. The first and second guiding portions 14 and 16 have the same shape and facing each other. Likewise, in the driven pulley 25, a third belt guiding portion 22 is formed at the first driven pulley-half 21 and a fourth belt guiding portion 24 is formed at the second driven pulley-half 23. The third and fourth guiding portions 22 and 24 have the same shape and facing each other.

The belt guiding portions 14, 16, 22, and 24 are formed to be approximately inwardly-curved surfaces where the metal belt 27 is supported. The method of obtaining the featured curved surfaces of the belt guiding portions 14, 16, 22, and 24 will be described later.

The metal belt 27 is a thin metal strip having rigidity and tension strength and supported while edge portions 49 of the metal belt 27 contact the belt guiding portions 14, 16, 22, and 24 of the driving pulley 17 and the driven pulley 25. The lengths and widths of the inner belt 45 and an outer belt 47 are different from each other. Thus, each of the metal belts 27 can run without interference between each other during operation since the belts circulate around the driving pulley 17 and the driven pulley 25 being spaced from each other without contacts. Of course, when three or more metal belts are applied, each metal belt can circulate freely without interference between each other to transfer power.

Also, since pulleys 17 and 25 rotate in a state in which the edge portions 49 of the metal belt 27 are in contact with the belt guiding portions 14, 16, 22, and 24, when the first and second driving pulley-halves 13 and 15 approach each other in directions indicated by arrows a, the metal belt 27 supported by the first and second belt guiding portions 14 and 16 moves in a direction indicated by an arrow c, thereby increasing the radius of rotation. Contrary to the above, as the first and second driving pulley-halves 13 and 15 are separated from each other in a direction indicated by arrows b, the metal belt 27 moves in a direction indicated by an arrow d, thereby decreasing the radius of rotation.

The above movements are applied to the driving pulley 17 and the driven pulley 25 in the same manner. When the first and second belt guiding portions 14 and 16 of the driving pulley 17 are separated, the third and fourth belt guiding portions 22 and 24 of the driven pulley 25 approach each other. Likewise, when the first and second belt guiding pulleys 14 and 16 of the driving pulley 17 approach each other, the third and fourth belt guiding portions 22 and 24 of the driven pulley 25 are separated. Therefore, the metal belt 27 always maintains a tightened state while rotating so that a smooth change of speeds is made.

Consequently, the movements of the first and second belt guiding portions 14 and 16 of the driving pulley 17 and those of the third and fourth guiding portions 22 and 24 of the driven pulley 25 are made concurrently but in opposite directions. Thus, by adjusting the distance between the surfaces of the driving pulley 17 and the driven pulley 25 facing each other, the radii of rotation of the metal belt 27 wound around the driving pulley 17 and the driven pulley 25 vary so that the rate of speed change can be altered.

As shown in the drawing, during operation at a reducing speed, the distance s2 between the inner belt 45 and the outer belt 47 wound around the driven pulley 25 is greater than the distance s1 between the inner belt 45 and the outer belt 47 wound around the driving pulley 17. This is to make the angular velocities of the inner belt 45 and the outer belt 47 circulating around the driving pulley 17 and the driven pulley 25 consistent with one another, which is made possible because each belt guiding portion is designed by the method to be described later.

The adjustment of the distances s1 and s2 between the belts 45 and 47 circulating around the pulleys 17 and 25 is possible since each of the belt guiding portions 14, 16, 22, and 24 is formed according to a calculation of the present invention. That is, since the first through fourth belt guiding portions 14, 16, 22, and 24 each have a curved surface according to the present calculation method, when the rate of speed change varies, the metal belt 27 does not slip with respect to the pulleys 17 and 25 so that a smooth transmission of power is achieved. In addition, even when two metal belts 27 are used in the above-described preferred embodiment, power can be transmitted at a different speed change rate by changing the number of the metal belts. Of course, greater power can be transmitted with more metal belts.

Figure 2:
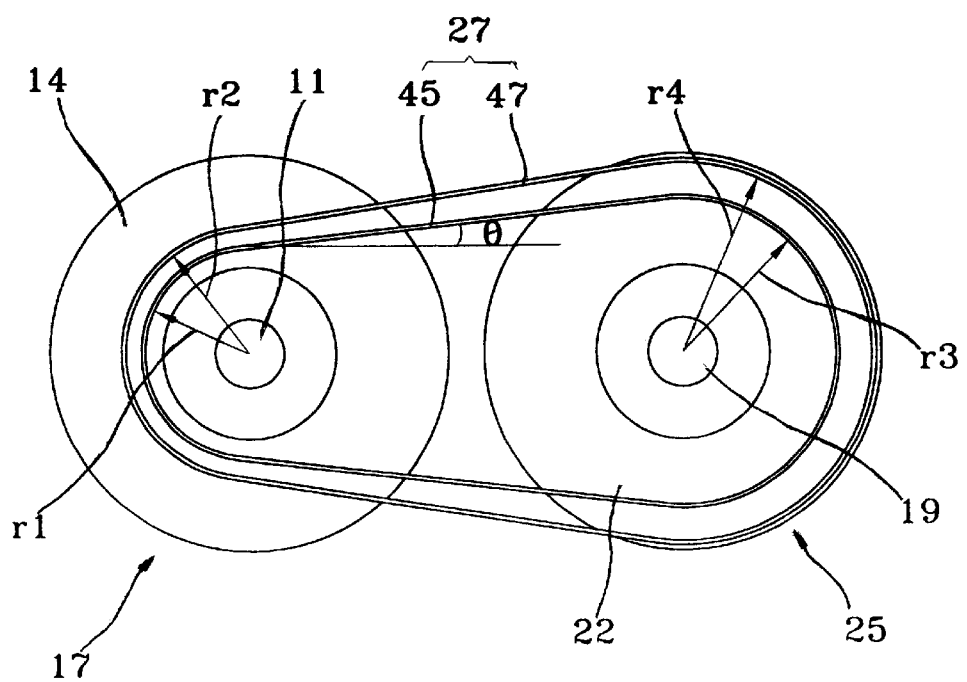
FIG. 2 is a view showing the power transmission mechanism using a metal belt of FIG. 1 in which belts are installed.
Figure 3:
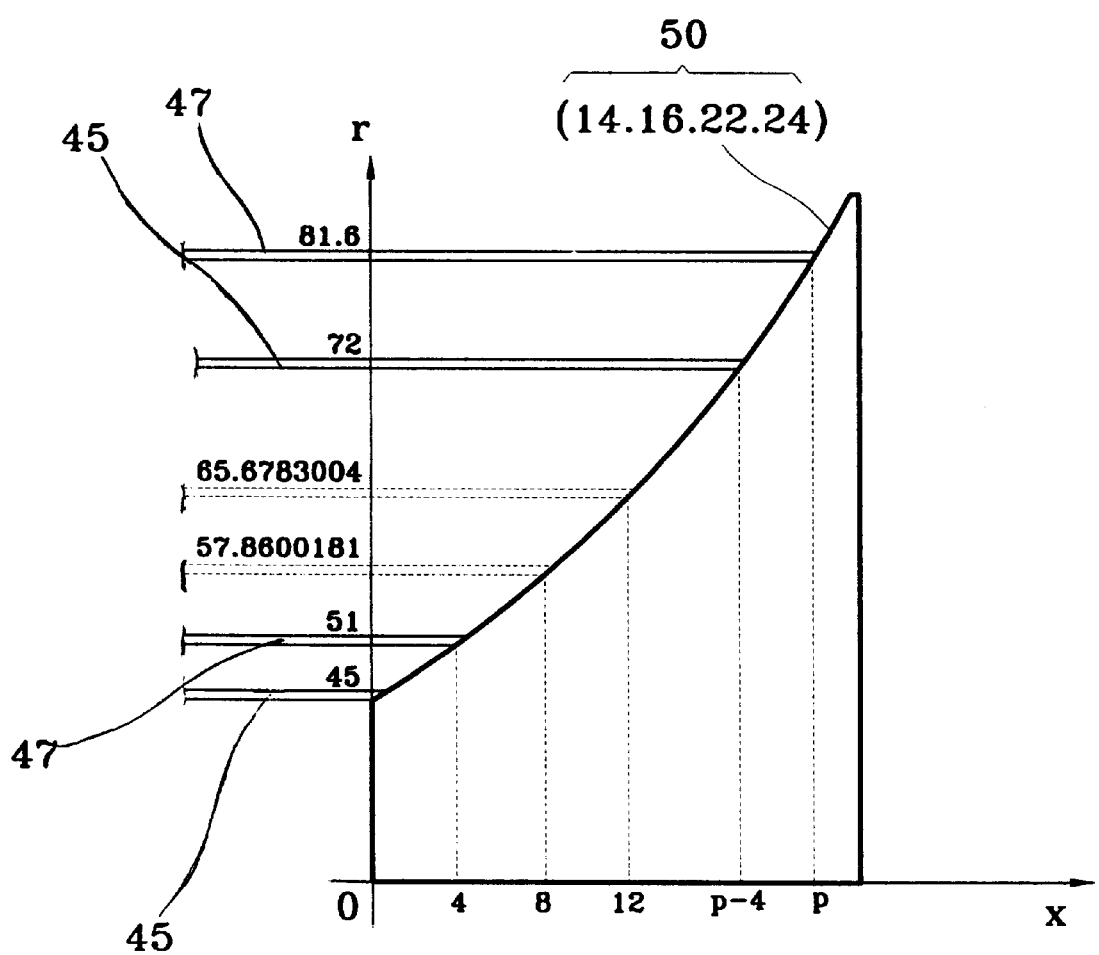
FIGS. 3 and 4 are coordinated diagrams of the belt guiding portion of pulley to obtain the shape of a belt guiding portion of the pulley according to the first preferred embodiment of the present invention.
Figure 4:
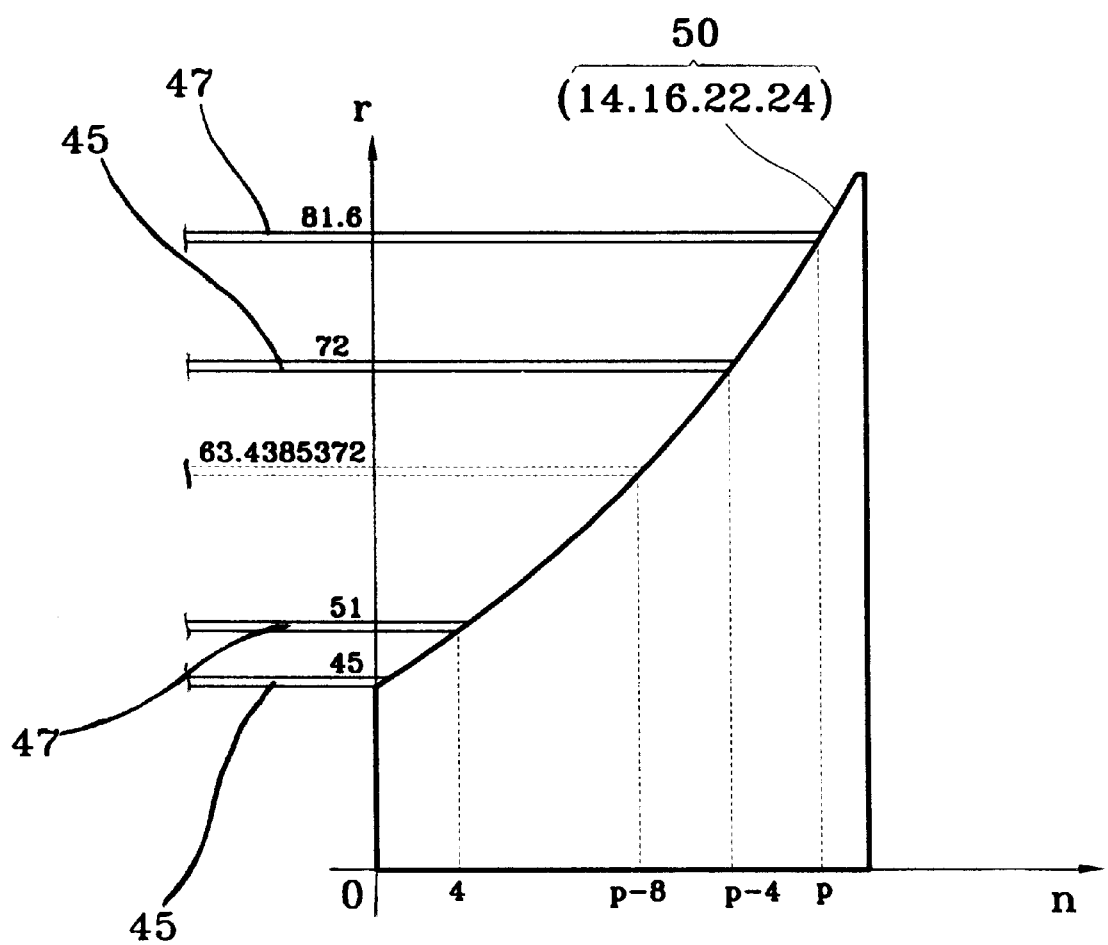

FIG. 2 shows the power transmission mechanism using a metal belt according to a preferred embodiment of the present invention, in which the belt is wound around pulleys. FIGS. 3 and 4 are coordinated diagrams in which the section of the pulley is indicated in coordinates to obtain a value of a curved function of the curved inclination portion forming the belt guiding portion.

Referring to FIG. 2, it can be seen that the metal belt 27 circulates at a reduced speed because the radii r3 and r4 of the metal belt 27 wound around the driven pulley 25 are greater than those of the metal belt 27 wound around the driving pulley 17.

In order to obtain features of a curved surface of the belt guiding portions 14, 16, 22, and 24, an inclination angle made by the metal belt 27 linearly moving between the driving pulley 17 and the driven pulley 25 with respect to the horizontal surface is set as θ; the rotational radius of the inner belt 45 wound around the driving pulley 17 is set as $r_1$; the rotational radius of the outer belt 47 is set as $r_2$; the rotational radius of the inner belt 45 wound around driven pulley 25 is set as $r_3$; and the rotational radius of the outer belt 47 is set as $r_4$. Then, the length and inclination angle of the metal belt 27 are expressed by Equations 1 and 2.

$$L \text{ (length of inner belt)} = 2 \times (\text{distance between axes}) \times \cos\theta + r_3 \times (\pi + 2\theta) + r_1 \times (\pi - 2\theta) \quad [1]$$

[Equation 2]

$$\theta(\text{inclination angle}) = \text{Arcsin}\left[\frac{(r_3 - r_1)}{\text{distance between axes}}\right]$$

Here, the distance between axes indicates the distance between the driving axis 11 and the driven axis 19.

In FIG. 3, to determine the shape of the curved surface of the belt guiding portions 14, 16, 22, and 24, the section of a belt guiding portion 50 of one pulley is applied to a graph and made into a coordinate. In order to obtain a function having the curved surface features of the belt guiding portion 50 in the graph, the following initial conditions are set.

(1) When x=0, the radius $r_1$ of the inner belt 45 of the driving pulley 17 is set to 45. When x=4, the radius $r_2$ of the outer belt 47 of the driving pulley 17 is set to 51.

(2) The distance between the driving axis 11 and the driven axis 19 is set to 165.

(3) The rate of speed change between the driving pulley 17 and the driven pulley 25 is set to 1.6:1.

(4) The difference in width between the inner belt 45 and the outer belt 47 is set to 8.

The radii of the inner belt 45 and the outer belt 47 wound around the driven pulley 25 can be obtained according to the above initial conditions. That is, because (rotational radius of belt of driving pulley 17)×(speed rate)=(rotational radius of belt of driven pulley 25), the rotational radius $r_3$ of the inner belt 45 and the rotational radius $r_4$ of the outer belt 47 wound around the driven pulley 25 can be obtained as follows.

$r_3 = r_1 \times 1.6 = 45 \times 1.6 = 72$ $r_4 = r_3 \times 1.6 = 51 \times 1.6 = 81.6$ Although the value x of the inner belt 45 and the outer belt 47 wound around the driven pulley 5 cannot be obtained, the value r can be obtained using the rate of speed change between the driving pulley 17 and the driven pulley 25.

Subsequently, the lengths of the inner belt 45 and the outer belt 47 are obtained by applying the rotational radii of the metal belts 45 and 47 installed around the driving and driven pulleys 17 and 25 to Equation 1 and Equation 2.

That is, the angle θ is primarily obtained to obtain the length of the inner belt 45.

$$\theta = \text{Arcsin} \frac{(72 - 45)}{165} = 0.1643756 \text{ rad}$$

The length of the inner belt 45 is:

$$L = 2 \times 165 \times \cos\theta + 72[\pi + 2\theta] + 45[\pi - 2\theta] = 701.9944612$$

Also, the angle θ of the outer belt 47 is obtained by the following equation.

$$\theta = \text{Arcsin} \frac{(81.6 - 51)}{165} = 0.1865344 \text{ rad}$$

The length of the outer belt 47 is obtained as follows.

$$L = 2 \times 165 \times \cos\theta + 81.6[\pi + 2\theta] + 51[\pi - 2\theta] = 752.26653$$

To obtain a curved surface of the belt guiding portion 50, a curve function of the belt guiding portion is represented as follows.

$$r = r_1 + ax + bx^2 + cx^3 \qquad [3]$$

Then, Equation 4 is obtained according to the initial conditions as follows.

$$51 = 45 + 4a + 16b + 64c \qquad [4]$$

When the first driving pulley-half 13 and the second driving pulley-half 15 of the driving pulley 17 closely approach each other because a change of speed is needed from the initial condition, the rotational radii $r_1$ and $r_2$ of the inner belt 45 and the outer belt 47 wound around the driving pulley 17 increase and simultaneously the rotational radii $r_3$ and $r_4$ of the inner belt 45 and the outer belt 47 wound around the driven pulley 25 decrease.

As determined in the initial condition, since the difference in width of the inner belt 45 and the outer belt 47 is 8, the difference in length in a direction +x is 4 in FIG. 3. Thus, when the inner belt 45 supported by and in contact with the belt guiding portion 50 is moved as much as 4 in the direction +x along the belt guiding portion 50 as the pulley moves, the inner belt 45 moves to the position where the outer belt 47 is initially wound so that the rotational radius of the inner belt 45 increases to 51. At the same time, the outer belt 47 moves to the position where x=8, the value of the rotational radius r of the outer belt 47 is the value to be obtained in the method to be described later. That is, when the radius of the inner belt 45 wound around the driving pulley 17 increases from 45 to 51 due to the above speed change, the rotational radius of the outer belt 47 increases from 51 to an unknown value r.

The radius of the outer belt 47 of the driving pulley 17 is obtained as described later using the fact that the length of the belt is constant.

First, when the rotational radius of the inner belt 45 of the driving pulley 17 is 51, the radius of the inner belt 45 of the driven pulley 25 is set as $r_3{}'$ and the angle of the belt with respect to the horizontal plane is obtained.

According to Equation 2, the angle of the inner belt 45 with respect to the horizontal plane is $$\theta = \text{Arcsin} \frac{(r_3' - 51)}{165}$$

When the value of θ and the value of the length of the inner belt 45 are applied to Equation 1, $$701.9944612 = 2 \times 165 \times \cos\left[\text{Arcsin}\frac{(r_3' - 51)}{165}\right] + r_3'\left[\pi + 2\text{Arcsin}\frac{(r_3' - 51)}{165}\right] + 51\left[\pi - 2\text{Arcsin}\frac{(r_3' - 51)}{165}\right]$$

Accordingly, the radius $r_3{}'$ of the inner belt 45 of the driven pulley, $r_3{}'=66.9202$, can be obtained from the above equation.

Also, when the radius of the inner belt 45 of the driving pulley 17 is 51, since the radius of the inner belt 45 of the driven pulley 25 is 66.9202, it can be seen that the speed rate is 1.31216:1.

Here, when the radius of the outer belt 47 of the driving pulley 17 is r according to the above speed rate, the radius of the outer belt 47 of the driven pulley 25 is such that $r_4{}'=1.31218r$. Accordingly, the inclination angle with respect to the horizontal plane of the outer belt 47 wound around the driving pulley 17 and the driven pulley 25 is obtained by Equation 2.

$$\theta = \text{Arcsin}\frac{(r_4' - r)}{165} = \text{Arcsin}\frac{(0.31216r)}{165}$$

When the value θ and the value of the length of the outer belt 47 are applied to Equation 1, $$752.26653 = 2 \times 165 \times \cos\left[\text{Arcsin}\frac{0.31216r}{165}\right] + 1.31218r\left[\pi + 2\text{Arcsin}\frac{(0.31216r)}{165}\right] + r\left[\pi - 2\text{Arcsin}\frac{(0.31216r)}{165}\right]$$

Here, r=57.8600181. That is, when the value of x of the outer belt 47 of the driving pulley 17 is 8, the rotational radius is 57.8600181.

In the same manner, when the value of x of the outer belt 47 of the driving pulley 17 is 12, the rotational radius is 65.67802.

When the above results are applied to Equation 3, the following equations are obtained.

$$57.8600181 = 45 + 8a + 64b + 512c \qquad [5]$$

$$65.67802 = 45 + 12a + 144b + 1728c \qquad [6]$$

When Equations 4, 5, and 6 are calculated together, a=1.400661; b=0.0238144; and c=0.0002551. As a result, the following equation defining the curve of the belt guiding portion 50 is obtained.

$$r=45+1.400661x+0.0238144x^2+0.0002551x^3 \quad [7]$$

Equation 7 defines the curve of the belt guiding portions 14, 16, 22, and 24 of the driving pulley 17 and the driven pulley 25, which is particularly appropriate for defining the lower portion of the intermediate portion of the belt guiding portion 50 shown in FIG. 3.

Sequentially, to obtain a curve functional equation defining the upper portion of the intermediate portion of the belt guiding portion 50 shown in FIG. 3 or FIG. 4, the value of x corresponding to the edge portion of the belt guiding portion 50 is set as p.

In the initial condition, since the rotational radius of the outer belt 47 wound around driven pulley 25 is 81.6 when x=p and there is no change in the difference in the widths of the inner belt 45 and the outer belt 47, the rotational radius of the inner belt 45 is 72 when x=p−4.

In the above state, when the driven pulley 25 moves as much as +4 in the direction x, the belt wound around the driven pulley 25 moves as much as −4 in the direction x relatively to the pulley so that the outer belt 47 is moved to the position where the inner belt 45 is wound and the rotational radius thereof becomes 72. Also, when x=p−8, 63.4385372 is obtained as the rotational radius of the inner belt 45 by using the facts that the length of the belt is constant and that the speed rate between the driving axis and the driven axis represented by the outer belt 47 and that between the driving axis and the driven axis represented by the inner belt 45 are the same. A method of obtaining the rotational radius of the inner belt 45 is the same as the above method.

A desired curve functional equation is arbitrarily set as follows.

$$r=a+bx+cx^2 \quad [8]$$

When the above condition is applied to Equation 8, the below equation is obtained.

$$81.6=a+pb+p^2c \quad [9]$$

$$72=a+(p-4)b+(p-4)^2c \quad [10]$$

$$63.43854=a+(p-8)b+(p-8)^2c \quad [11]$$

Equation 12 is obtained by applying r=65.67802 when x=12 to Equation 8 considering the continuity in curve represented by Equation 7.

$$65.67802=a+12b+144c \quad [12]$$

Sequentially, from Equations 8, 9, 10 and 11, the a, b, c and p are obtained. That is, a is 45.3725; b is 2.3027; c is 0.023245423; and p is 18.90534. The obtained values of a, b, c and p are applied to Equation 8.

$$r=45.3725+2.3027x+0.023245423x^2 \quad [13]$$

Consequently, the shape of the belt guiding portion 50 of the driving pulley 17 and the driven pulley 25 is determined by Equation 7 and Equation 13, that is, by Equation 7 when x is from 0 to 12 and by Equation 13 when x is from 12 to 18.90534. When the speed ratio between the driving pulley 17 and the driven pulley 25 is 1:1, a condition of x=12 is a position corresponding to an approximate intermediate value between the values of x at the position where the inner belt 45 contacts the belt guiding portion 50 and at the position where the outer belt 47 contacts the belt guiding portion 50.

The belt guiding portions 14, 16, 22, and 24 of the pulley formed to satisfy Equations 7 and 13 prevent the belt 27 from slipping from the pulleys 17 and 25 or do not generate other minor forces so that power can be accurately transferred.

As described above, one or more belts can be installed between the inner belt 45 and the outer belt 47. For example, one intermediate belt can be installed between the outer belt 47 and the inner belt 45. Here, when the inner belt 45 is located at the position of x=0, the intermediate belt is located at the position of x=2. At this position, it can be calculated that the rotational radius r of the intermediate belt is 47.8986 and the length of the intermediate belt is 726.2613 by Equation 7.

When the belt moves as much as +4 in the direction x in the above initial state, the value x of the intermediate belt becomes 6 and the rotational radius r becomes 54.31637 and the length of the belt is 726.2907 which is 0.0294 longer than 726.2613. Also, the length of the belt at the position when the belt further moves as much as 4 in the direction x is calculated to be 0.069 longer. When the radius of the intermediate belt of the driven belt is determined, although the value x corresponding to the rotational radius should be as much as 2 greater than that of the inner belt 45 of the driven pulley 25 in a normal case; an error of 0.013 is generated in calculation. Other minor forces caused from the above error applied to a part of the belt due to the error is negligible compared to a tension applied to transfer power and practically has no effect. Also, the error further decreases by increasing the inclination angle of the belt guiding portions 14, 16, 22, and 24 or decreasing the distance between axes. When the scope of speed change is small, the error decreases.

Figure 5:
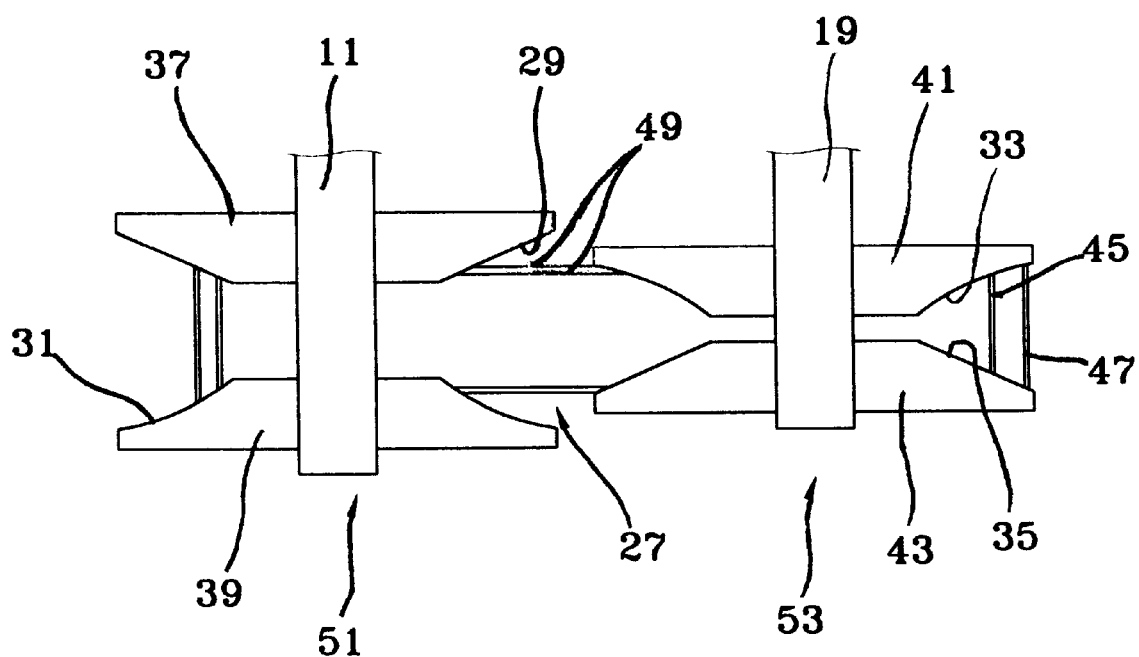
FIG. 5 is a view showing the structure of a power transmission mechanism using a metal belt according to the second preferred embodiment of the present invention.

FIG. 5 shows the structure of a power transmission mechanism using a metal belt according to the second preferred embodiment of the present invention. Here, the same reference numerals as those used in the above indicate the same elements having the same functions.

As shown in the drawing, the shape of facing surfaces of a pulley of the power transmission mechanism using a metal belt according this preferred embodiment is changed compared to that of the power transmission mechanism using a metal belt according the first preferred embodiment.

That is, first and second belt guiding portions 29 and 31 formed on facing surfaces of first driving pulley-half 37 and a second driving pulley-half 39 constituting a driving pulley 51 have different shapes. The first belt guiding portion 29 formed on a surface of the first driving pulley-half 37 is a linearly inclined surface while the second belt guiding portion 31 formed on a surface of the second driving pulley-half 39 is a concavely inclined surface. The linear first belt guiding portion 29 is inclined a predetermined degree and supports one edge portion 49 of the metal belt 27. The second belt guiding portion 31 formed to face the first belt guiding portion 29 supports the metal belt 27.

The shape of the belt guiding portions 29 and 31 of the first and second driving pulley-halves 37 and 39 are formed to compensate for the shape of the belt guiding portion of the facing pulley-half as much as the shape of the belt guiding portion is changed in a state where the driving pulley-halves 37 and 39 face each other.

The pulley-halves 41 and 43 are formed to have an arrangement opposite to that of the pulley-halves 37 and 39 of the driving pulley 51. That is, the first driven pulley-half 41 having a curved inclined surface contrary to the driving pulley 51 is disposed in the upper portion in the drawing and the second driven pulley-half 43 having a linearly inclined surface is disposed in the lower portion such that the positions of the driving pulley 51 and the driven pulley 53 can be symmetrical.

The first, second, third and fourth belt guiding portions 29, 31, 33, and 35 of the power transmission mechanism using a metal belt according to the above present embodiment is formed to be capable of adjusting the rotational radius of the belt according to the rotational speed of each pulley as shown in the first preferred embodiment so that an identical angular velocity can be provided even when the rotational radius of the operating belt differs.

Although a quadratic function and a cubic function are used in the above description, depending on the number of conditional equations, the order of a function varies and each function can be easily solved by commercial software.

As described above, the power transmission mechanism using metal belts of the present invention can transfer great power by using a plurality of metal belts as a belt connecting the driving pulley and the driven pulley. Also, since each metal belt rotates at the same speed rate around pulleys, the angular velocity of each metal belt on a pulley is identical. Thus, since no slippage occurs between the pulley and the metal belt, power loss or abrasion is very low. Further, since the engagement between the metal belt and the pulley is made continuously, no noise is generated. Since each metal belt is disposed to be separated from a neighboring metal belt, tolerance in length of the belt is not strict and correction can be made by adjusting the width corresponding to the length so that manufacture thereof is simplified.

It is noted that the present invention is not limited to the preferred embodiment described above, and it is apparent that variations and modifications by those skilled in the art can be effected within the spirit and scope of the present invention defined in the appended claims.

What is claimed is:

1. A power transmission mechanism comprising:

A driving pulley having first and second driving pulley-halves which are installed at a driving axis to be capable of moving close to, or move further apart from one another, and on which first and second belt guiding portions are formed to face each other;

A driven pulley having first and second driven pulley-halves which are installed at a driven axis parallel to the driving axis and to be capable of moving close to, or move further apart from one another, and on which third and fourth belt guiding portions are formed to face each other; and At least two transmission belts adapted to encircle and engage the belt guiding portions of the driving pulley and the driven pulley without interference, and Wherein at least one belt guiding portion of the driving pulley and at least one belt guiding portion of the driven pulley each are formed of two curved surfaces consecutively formed of a first curved inclined surface and a second curved inclined surface, and the incremental rates of gradients of the first curved inclined surface increase from the inside of the pulley to the outside thereof along the axial direction while the incremental rates of gradients of the second curved inclined surface which is consecutive with the first curved inclined surface are constant, from a consecutive portion with the first curved inclined surface to the outside of the pulley along the axial direction.

2. A power transmission mechanism according to claim 1, wherein the inclined surfaces are calculated to provide substantially equivalent angular velocity for each belt at an arbitrary speed rate between the driving pulley and the driven pulley.

3. A power transmission mechanism according to claim 1, wherein curves made by the first and second curved inclined surfaces satisfy two functions which are different from each other.

4. A power transmission mechanism according to claim 1, wherein the first, second, third and fourth belt guiding portions are formed of curved inclined surfaces hating the same shapes.

5. A power transmission mechanism according to claim 1, wherein each of the second and third belt guiding portions is formed of two curved surfaces of the first and second curved inclined surfaces which are consecutively formed, and the first and fourth belt guiding portions are formed of flat, straightly inclined surfaces.

6. A power transmission mechanism according to claim 4, wherein curves made by the first and second curved inclined surfaces satisfy two functions which are different from each other.

7. A power transmission mechanism according to claim 5, wherein curves made by the first and second curved inclined surfaces satisfy two functions which are different from each other.

* * * * *